United States Patent
Agostinelli et al.

(10) Patent No.: US 10,348,199 B2
(45) Date of Patent: Jul. 9, 2019

(54) STEP-DOWN CONVERTER CONTROL

(71) Applicant: Infineon Technologies AG, Neubiberg (DE)

(72) Inventors: Matteo Agostinelli, Udine (IT); Francesco Santoro, Tavagnacco (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/617,750

(22) Filed: Jun. 8, 2017

(65) Prior Publication Data

US 2018/0358899 A1 Dec. 13, 2018

(51) Int. Cl.
- *H02M 3/157* (2006.01)
- *H02M 1/08* (2006.01)
- *H02M 1/00* (2006.01)

(52) U.S. Cl.
CPC .............. *H02M 3/157* (2013.01); *H02M 1/08* (2013.01); *H02M 2001/0012* (2013.01); *H02M 2001/0022* (2013.01); *H02M 2001/0048* (2013.01)

(58) Field of Classification Search
CPC .................. H02M 1/08; H02M 3/157; H02M 2001/0048; H02M 2001/0012; H02M 2001/0022

See application file for complete search history.

(56) References Cited

U.S. PATENT DOCUMENTS

| | | | | |
|---|---|---|---|---|
| 7,245,113 B2* | 7/2007 | Chen | ................... | H02M 3/1588 323/271 |
| 7,482,788 B2* | 1/2009 | Yang | ................... | H02M 3/1588 323/224 |
| 2005/0270813 A1* | 12/2005 | Zhang | ................... | H02M 3/157 363/89 |
| 2015/0029760 A1* | 1/2015 | Karlsson | ................. | H02M 1/08 363/17 |
| 2018/0062513 A1* | 3/2018 | Arbetter | ................. | H02M 1/08 |

OTHER PUBLICATIONS

"A buck converter with adaptive on-time PFM control and adjustable output voltage," Hyunseok Nam, Youngkook Ahn, Jeongjin Roh Analog Integrated Circuits and Signal Processing, 2012, vol. 71, No. 2, p. 327.*

W. Fu, et al., "A DCM-Only Buck Regulator With Hysteretic-Assisted Adaptive Minimum-on-Time Control for Low-Power Microcontrollers", pp. 418-429, 2015, IEEE.

(Continued)

*Primary Examiner* — Adolf D Berhane
*Assistant Examiner* — Jye-June Lee
(74) *Attorney, Agent, or Firm* — Schiff Hardin LLP

(57) ABSTRACT

A method and apparatus for controlling a step-down converter, including setting an on-state time ($T_{ON}$) to a default $T_{ON}$; switching, when an output voltage of the step-down converter falls below a reference output voltage, the step-down converter to an on-state for a duration of the $T_{ON}$; and switching, at the end of the $T_{ON}$, the step-down converter to an off-state for a minimum off-state time ($T_{OFF}$).

14 Claims, 8 Drawing Sheets

(56) References Cited

OTHER PUBLICATIONS

F. Ma, et al. "A Monolithic Current-Mode Buck Converter With Advanced Control and Protection Circuits", pp. 1836-1846, 2007, IEEE.
J. Sun, et al., "Light-Load Efficiency Improvement for Buck Voltage Regulators", pp. 742-751, 2009, IEEE.
X. Zhang, et al., "Multimode Digital Controller for Synchronous Buck Converters Operating Over Wide Ranges of Input Voltages and Load Currents", pp. 1958-1965, 2010, IEEE.

* cited by examiner

STEP-DOWN CONVERTER CONTROL

BACKGROUND

Direct Current-to-Direct Current (DC-to-DC) converters are often optimized for high load conditions, with their performance degrading during light load conditions. High performance in terms of high efficiency is required in a wide range of loads, such as watts when the product is active, and microwatts when the product is idle.

A DC-to-DC converter may operate under various operating conditions (e.g., input voltage and load current) or different product variants must be supported. Therefore, different external components (e.g., inductors and capacitors) must be supported. A controller that is digitally implemented is preferable. However, in light load conditions, care must be taken such that the power consumption of the digital controller does not heavily contribute to power losses, severely reducing overall conversion efficiency.

Several control techniques for DC-to-DC converters operating in light load conditions have been proposed. Typically these techniques involve reduced switching frequency when the load drops to a low value. This is an obvious technique considering that losses of DC-to-DC converters are mainly caused by conduction losses (due to finite resistances of components, such as power MOSFETs) and switching losses (due to energy spent in the commutation of switching and charging/discharging of gate capacitances of the power MOSFETs). When the load decreases, the conduction losses also decrease, and switching losses become the dominant contributor. Therefore, the switching frequency should be reduced in this range in order to maintain high efficiency. In light load conditions, the DC-to-DC converter is typically operated in Pulse Frequency Modulation (PFM) and the switching frequency is typically decreasing with decreasing load.

A DC-to-DC controller that optimizes light load efficiency is typically implemented in the analog domain in order to save power. A digital implementation is normally not attractive because of the extra losses caused by the Analog-to-Digital Converter (ADC) and by the digital core itself. However, a digital controller is attractive for other reasons, such as flexibility and programmability.

DETAILED DESCRIPTION

The present disclosure is directed to controlling a step-down converter to be optimized not only for high load conditions, but also for light load conditions by controlling switching parameters.

Figure 1:
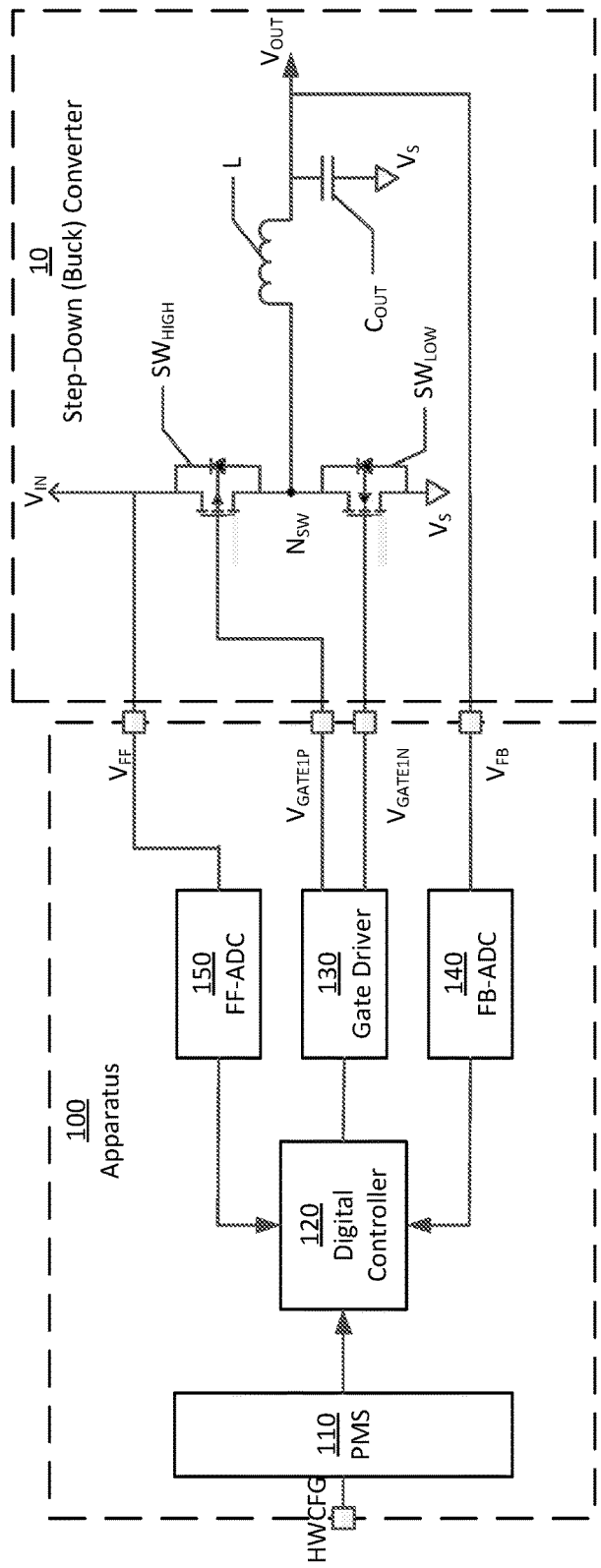
FIG. 1 illustrates an apparatus for a step-down converter in accordance with aspects of the disclosure.

FIG. 1 illustrates an apparatus 100 for a step-down converter 10 in accordance with an aspect of the disclosure, and also illustrates a conventional step-down converter 10 to place the apparatus 100 in context.

The step-down converter 10 in this example is a buck converter, but the disclosure is not limited in this respect. The disclosure is applicable to any step-down converter.

The step-down converter 10 comprises a high-side switch $SW_{HIGH}$, a low-side switch $SW_{LOW}$, an inductor L, and an output capacitor $C_{OUT}$. The high-side switch $SW_{HIGH}$ is coupled in series with the low-side switch $SW_{LOW}$ between an input voltage $V_{IN}$ and a source voltage $V_S$, with a switching node $N_{SW}$ therebetween. The switches $SW_{HIGH}$, $SW_{LOW}$ are implemented as MOSFETs, though the disclosure is not limited in this respect. The inductor L is coupled between the switching node $N_{SW}$ and an output voltage $V_{OUT}$. The capacitor Coin is coupled between the output voltage $V_{OUT}$ and the source voltage $V_S$.

Buck converters may be synchronous or asynchronous. The buck converter 10 shown in FIG. 1 is synchronous in that there are two switches, the high-side switch $SW_{HIGH}$ and the low-side switch $SW_{LOW}$. In an asynchronous buck converter, on the other hand, the low-side switch $SW_{LOW}$ is replace with a diode, so only one switch needs to be controlled. However, diodes are less efficient than switches in that when there is a large current, there is a more significant voltage drop over the diode than over the switch, and this translates into additional losses.

The apparatus 100 comprises a Power Management System (PMS) 110, a digital controller 120, a gate driver 130, a FeedBack-Analog-to-Digital Converter (FB-ADC) 140, and a FeedForward-ADC (FF-ADC) 150.

The PMS 110 is a global state machine and digital logic that configures the controller 120 and the gate driver 130. The PMS 110 is configured to receive a hardware configuration signal (HWCFG), which comprises digital bits used to configure the apparatus 100.

The controller 120 is shown as a digital controller, but may alternatively be an analog controller. The controller 120 is configured to dynamically regulate on-time $T_{ON}$, off-time $T_{OFF}$, and switching time $T_{SW}$ of the step-down converter 10 when operating in light load conditions, as discussed in detailed below with respect to FIGS. 3A and 3B.

The gate driver 130 is configured to receive a control signal from the controller 120 and drive gate voltages $V_{GATE1P}$ and $V_{GATE1N}$ of the high-side switch $SW_{HIGH}$ and the low-side switch $SW_{LOW}$, respectively.

The FeedBack ADC (FB-ADC) 140 is configured to convert the output voltage $V_{OUT}$ of the step-down converter 10 from analog to digital, and provide the digital version of the output voltage $V_{OUT}$ to the controller 120.

The FeedForward Analog-to-Digital Converter (FF-ADC) 150 is configured to convert the input voltage $V_{IN}$ of the step-down converter 10 from analog to digital, and provide the digital version of the input voltage $V_{IN}$ to the controller 120.

The controller 120 may be configured to control the step-down converter 10 based on values of the following: output voltage $V_{OUT}$, input voltage $V_{IN}$, inductor L, and output capacitor $C_{OUT}$. The output voltage $C_{OUT}$ is measured directly. The input voltage $V_{IN}$, inductor L, and output capacitor $C_{OUT}$ may be measured directly, or alternatively, estimated. For a digital implementation, a clock signal performs various timing measurements. The controller 120 takes these values into consideration to manipulate timing parameters (on-time $T_{ON}$, off-time $T_{OFF}$, switching time $T_{SW}$) of the stepdown converter 10 in order to optimize power transfer during a light load condition. These timing parameters are adjusted dynamically in order to maximize the conversion efficiency and limit ripple of the output voltage $V_{OUT}$.

Figure 2:
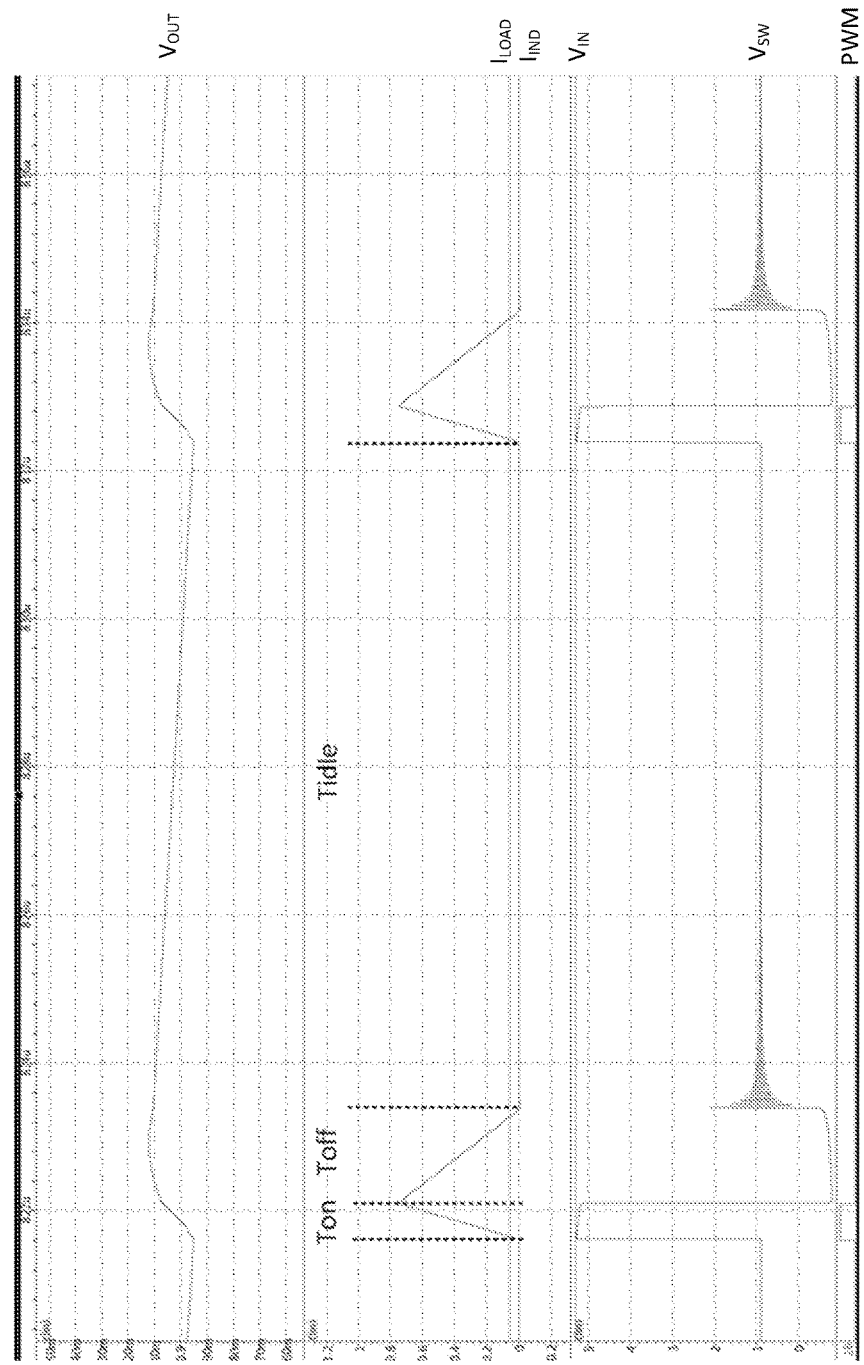
FIG. 2 illustrates a timing diagram in accordance with aspects of the disclosure.

FIG. 2 illustrates a timing diagram 200 in accordance with aspects of the disclosure.

The timing diagram 200 shows signals of the step-down converter 10. These signals are the output voltage $V_{OUT}$, load current $I_{LOAD}$, inductor current $I_{IND}$, input voltage $V_{IN}$, switching node voltage $V_{SW}$, and Pulse Width Modulation (PWM) signal.

The on-time $T_{ON}$ is defined as when the step-down converter 10 is in an on-state, that is, when the high-side switch $SW_{HIGH}$ (connected to $V_{GATE1P}$) is conducting and the low-side switch $SW_{LOW}$ (connected to $VG_{ATE1N}$) is off. In this state the switching node $N_{SW}$ is coupled to the input voltage $V_{IN}$, so the switching voltage $V_{SW}$ is roughly equal to the input voltage $V_{IN}$. Also, the voltage across the inductor L is positive, so the inductor L is being charged with the inductor current $I_{IND}$ increasing.

The off-time $T_{OFF}$ is defined as when the step-down converter 10 is this in an off-state, that is, when the high-side switch $SW_{HIGH}$ (connected to $V_{GATE1P}$) is off and the low-side switch $SW_{LOW}$ (connected to $VG_{ATE1N}$) is conducting. The switching node $N_{SW}$ is coupled to the source voltage $V_S$, so the switching voltage $V_{SW}$ is roughly equal to the source voltage $V_S$. Also, the voltage across the inductor L is negative, so the inductor L is being discharged with the inductor current $I_{IND}$ is decreasing.

The idle-time $T_{IDLE}$ occurs at the end of the off-time $T_{OFF}$, and is when both switches $SW_{HIGH}$, $SW_{LOW}$ are off. During this idle-time the inductor current $I_{IND}$ is zero.

A total switching period $T_{TOT}$ is defined as the sum of the on-time $T_{ON}$, the off-time $T_{OFF}$, and the idle-time $T_{IDLE}$. The switching period/frequency is important because it has a significant impact on the losses of the step-down converter 10. In order to optimize efficiency, the controller 120 is configured to extend the total switching period $T_{TOT}$ to reduce the switching frequency, and thus, switching losses.

The step-down converter 10 in the example shown operates in Discontinuous Conductive Mode (DCM), so for a significant part of the switching period the inductor current $I_{IND}$ is zero. This reduces conduction losses. The output voltage $V_{OUT}$ is shown regulating around 0.9 V. As can be seen, the output voltage $V_{OUT}$ has some ripple.

Figure 3A:
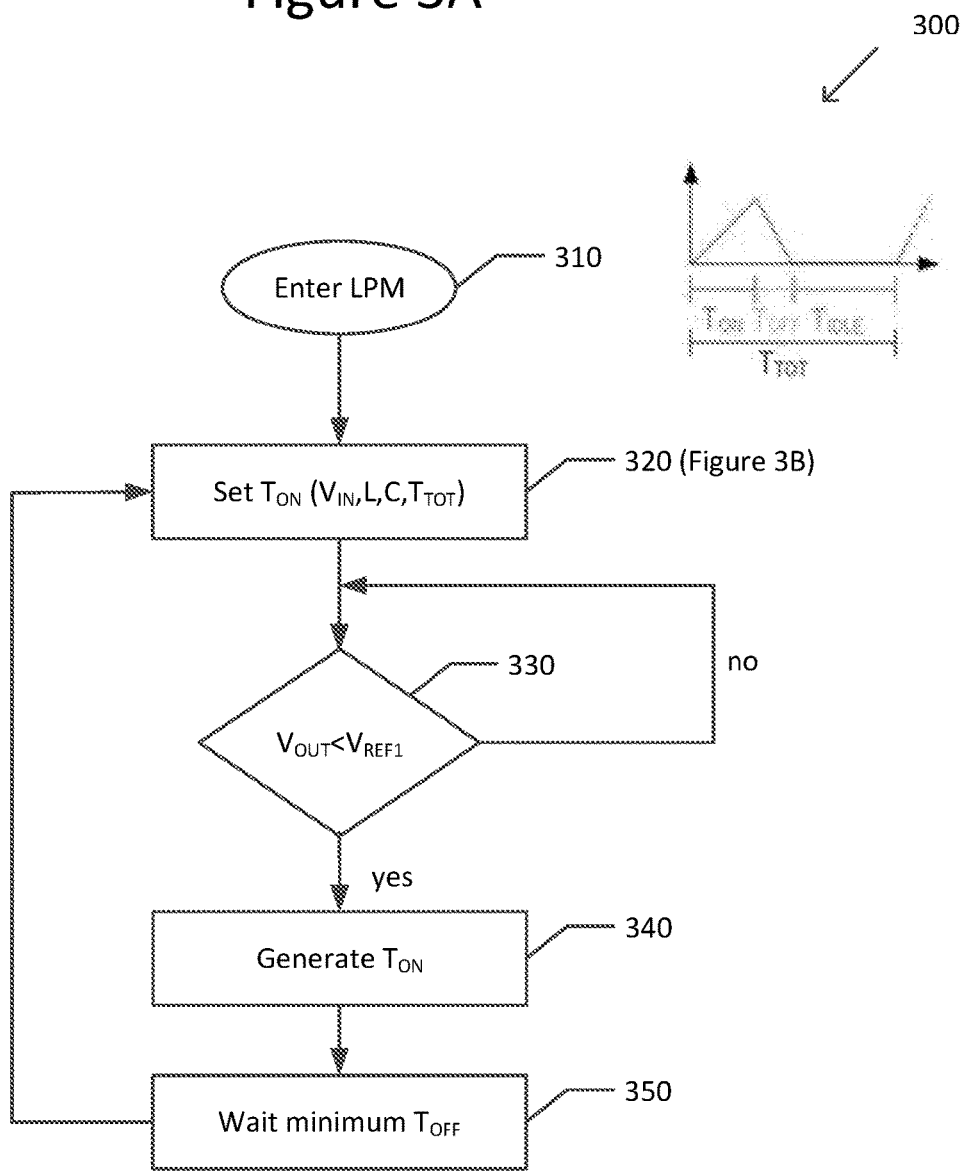
FIGS. 3A and 3B illustrate a flowchart of a method for controlling a step-down converter in accordance with aspects of the disclosure.
Figure 3B:
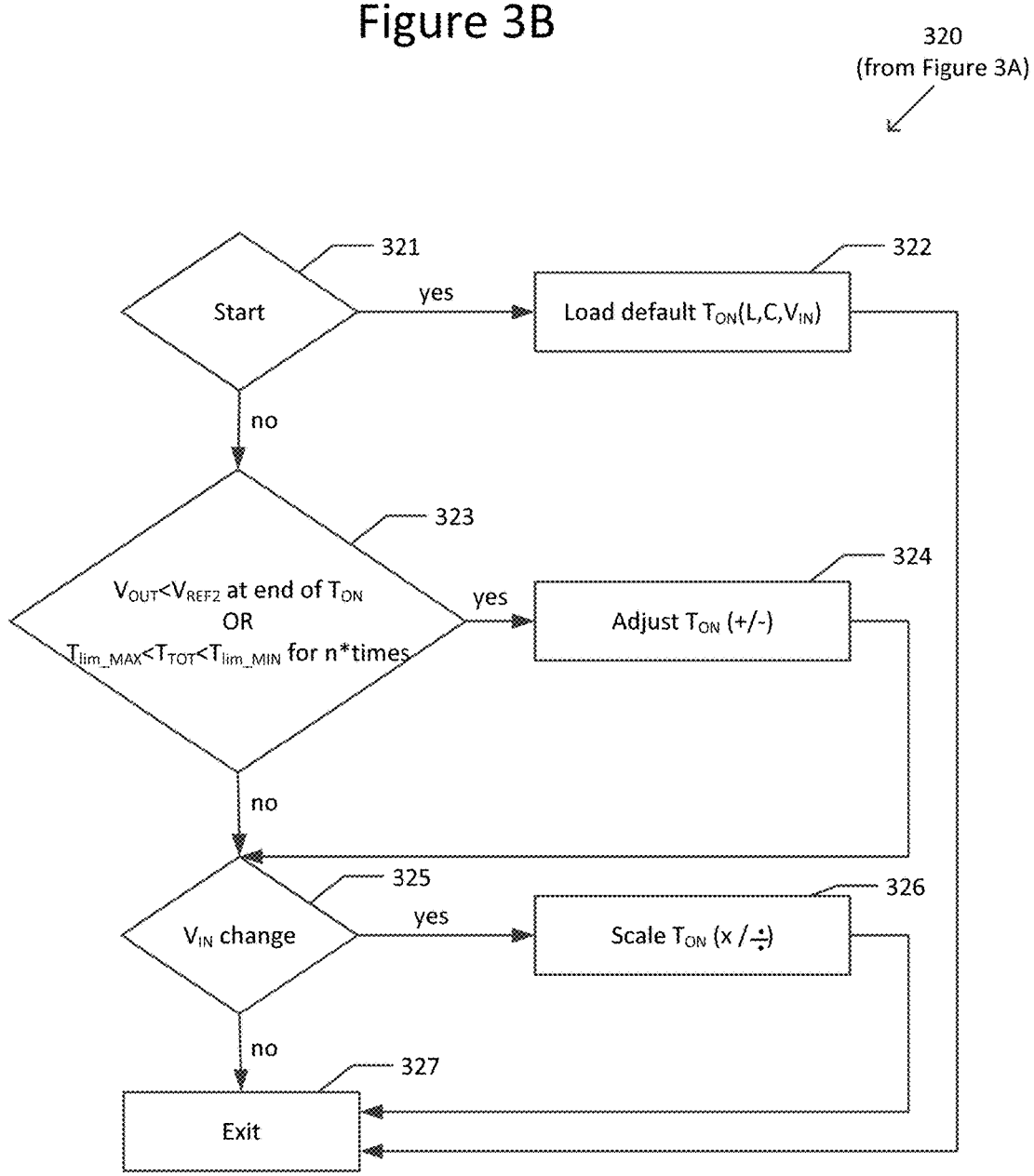

FIGS. 3A and 3B illustrate a flowchart 300 of a method for controlling a step-down converter 10 in accordance with aspects of the disclosure.

Referring to FIG. 3A, when the controller 120 enters Low-Power Mode (LPM) at Step 310, the step-down converter modulation scheme changes typically from PWM-CCM (Continuous Conduction Mode) to a constant on-time $T_{ON}$ mode with variable switching frequency. The LPM is when a load of the step-down converter 10 consumes less than a predetermined amount of power. This is a light load condition defined relative to maximum power. For example, assuming the step-down converter 10 is a buck converter designed to provide a maximum power of X watts, a light load condition may be, for example, when the load is less than X/100, or even less than X/1000, though the disclosure is not limited in this respect.

The on-time $T_{ON}$ is initially set to a default on-time $T_{ON}$ at Step 320. An appropriate value of the default on-time $T_{ON}$ is a design value generally based on values of the input voltage $V_{IN}$, inductor L, output capacitor $C_{OUT}$, and total switching period $T_{TOT}$. The on-time $T_{ON}$ is subsequently adjusted dynamically, as will be described in detail below with respect to FIG. 3B.

When the output voltage $V_{OUT}$ of the step-down converter 10 falls below a predefined reference output voltage $V_{REF1}$ (Step 330), the controller 120 is configured to generate a pulse to switch the step-down converter 10 to the on-state for a duration of the on-time $T_{ON}$ (Step 340). As discussed above, the on-state is when the high-side switch $SW_{HIGH}$ is conducting and the low-side switch $SW_{LOW}$ is off, and thus the inductor L is being charged and the output voltage $V_{OUT}$ is increasing. During this on-time $T_{ON}$, the PWM output signal (shown in FIG. 2) is high.

At the end of the on-time $T_{ON}$, the controller 120 is configured to reset the PWM signal to low, that is, the controller 120 switches the step-down converter 10 to an off-state. As discussed above, the off-state is when the high-side switch $SW_{HIGH}$ is off and the low-side switch $SW_{LOW}$ is conducting. This off-state is maintained for a minimum off-time $T_{OFF}$ (Step 350), followed by the idle state. During the off-time $T_{OFF}$, and also during the idle-time $T_{IDLE}$, the output voltage $V_{OUT}$ is decreasing because charge is not being provided to the output capacitor $C_{OUT}$, which is slowly discharging.

The controller 120 then configured to return to the Step 320 and the subsequent Steps 330, 340, 350 are repeated until the LPM is disabled. During the return to Step 320 the on-time $T_{ON}$ being adjusted dynamically, as described in FIG. 3B, instead of being set to the initial default value.

FIG. 3B illustrates the details of how the controller 120 during operation dynamically adjusts the on-time $T_{ON}$ of Step 320. The adjusting process starts at Step 321, and then as mentioned above, the on-time $T_{ON}$ is initially set to a default on-time $T_{ON}$ preloaded in a register (Step 322). The register may be any type of memory as suitable for the intended purpose.

There are three types on-time $T_{ON}$ of dynamic regulation, not all of which are required. The controller 120 may be configured to use any one, two, or three of these dynamic regulations.

The first dynamic regulation of the on-time $T_{ON}$, shown in a first portion of Step 323, depends on the value of the output voltage $V_{OUT}$ at the end of the on-time $T_{ON}$. If the output voltage $V_{OUT}$ of the step-down converter 10 at end of the on-time $T_{ON}$ is less than a second reference output voltage $V_{REF2}$, the on-time $T_{ON}$ is not long enough to guarantee regulation, that is, the output voltage $V_{OUT}$ will continue to fall each switching period because there is not enough charge being transferred to the output capacitor $C_{OUT}$. Therefore, if this condition is met, the controller 120 is configured to extend the on-time $T_{ON}$. This second reference output voltage $V_{REF2}$ may or may not be set to have a same value as the reference output voltage $V_{REF1}$ of Step 330.

Figure 4:
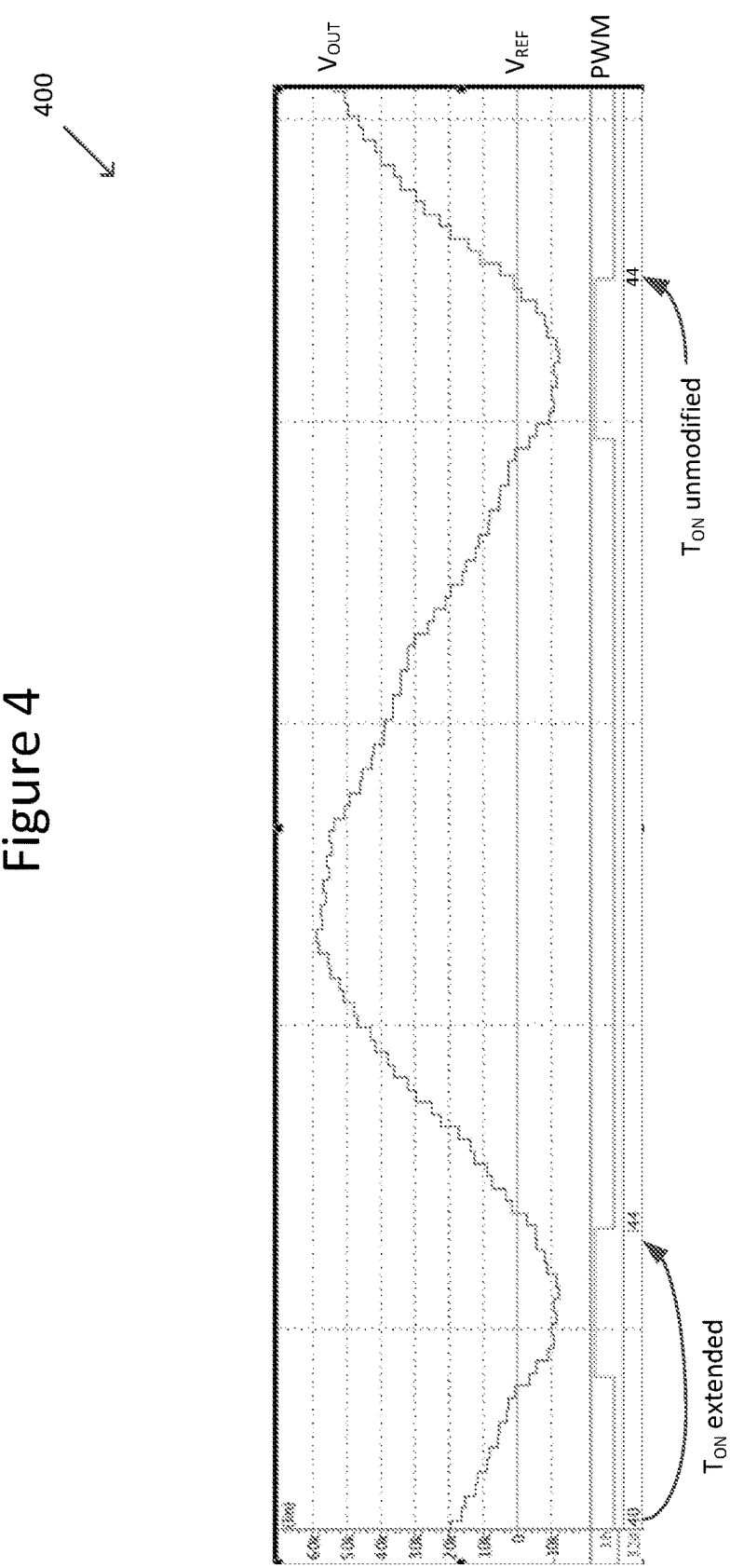
FIG. 4 illustrates another timing diagram in accordance with aspects of the disclosure.

FIG. 4 illustrates a timing diagram 400 showing an example of the first dynamic regulation (i.e., the on-time $T_{ON}$ is not long enough to guarantee regulation) where the digitized output voltage $V_{OUT}$ is shown together with the reference output voltage $V_{REF2}$ and the PWM signal. Initially in this example the on-time $T_{ON}$ is 40 clock cycles, where one clock cycle corresponds to 10 ns. At the end of the on-time $T_{ON}$, which is when the PWM goes low, the output voltage $V_{OUT}$ is sampled. If the output voltage $V_{OUT}$ is less than the second reference output voltage $V_{REF2}$, the controller 120 is configured to extend the on-time $T_{ON}$; in this example, the on-time $T_{ON}$ is extended from 40 clock cycles to 44 clock cycles. At the end of the next switching period the on-time $T_{ON}$ being 44 clock cycles is long enough because at the falling edge of PWM signal the output voltage $V_{OUT}$ is greater than the second reference voltage $V_{REF2}$; the on-time $T_{ON}$ is therefore left unmodified at 44 clock cycles.

Figure 5:
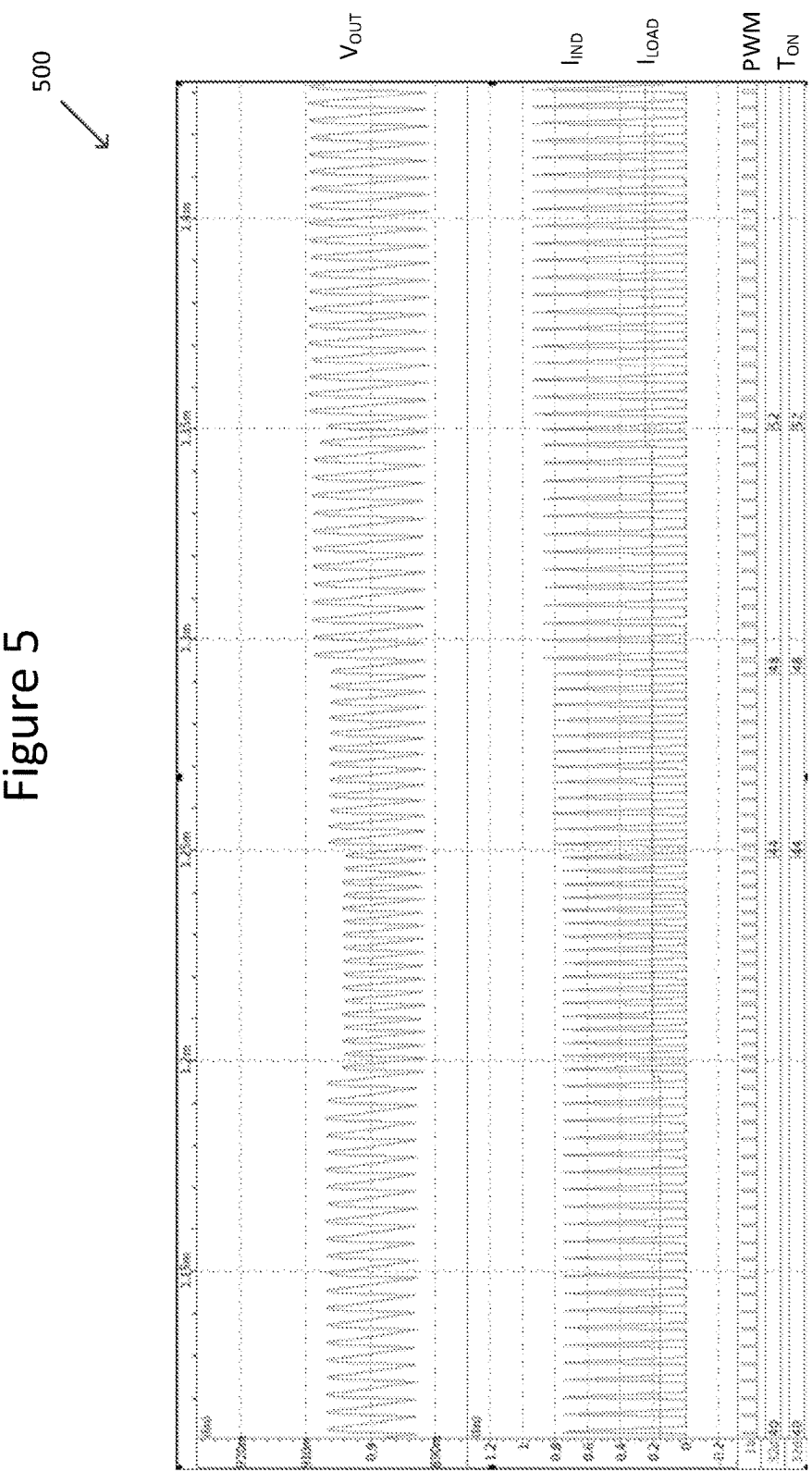
FIG. 5 illustrates another timing diagram in accordance with aspects of the disclosure.

FIG. 5 illustrates a timing diagram 500 showing a longer transient, as compared with FIG. 4, with the output voltage $V_{OUT}$, inductor current $I_{IND}$, PWM signal, and on-time $T_{ON}$. A sequence of positive load current steps $I_{LOAD}$ is applied to the step-down converter 10, and the result of the controller 120 increasing the duration of the on-time $T_{ON}$ can be seen.

More specifically, there is a sequence of load steps increasing the value of the load current $I_{LOAD}$. If the load current $I_{LOAD}$ is increased, more current should be provided to the output capacitor $C_{OUT}$. In this example the output voltage $V_{OUT}$ at the one of the on-time $T_{ON}$ is too low, and thus the controller 120 increases the on-time $T_{ON}$ from 40 to 44, then to 48, and then to 52. The more the load current $I_{LOAD}$ is increased, the more the controller 120 compensates by increasing the on-time $T_{ON}$. The load current $I_{LOAD}$ corresponds with the average value of the inductor current $I_{IND}$. As the load current $I_{LOAD}$ is increased, there is a small increase in the peak value of the inductor current $I_{IND}$ and in the frequency to result in a higher average value of the inductor current $I_{IND}$.

Referring back to FIG. 3B, the second dynamic regulation of the on-time $T_{ON}$, shown in a second portion of Step 323, depends on the total switching period $T_{TOT}$. This regulation limits ripple in the output voltage $V_{OUT}$. In fact, when the total switching period $T_{TOT}$ is increasing, the output voltage ripple is also increasing. The controller 120 is configured to dynamically adjust (in Step 324) the on-time $T_{ON}$ when a length of time of the total switching period $T_{TOT}$ of the step-down converter 10 is outside of a predetermined time range for a predetermined amount of time, that is, when greater than an upper time limit $T_{lim\_MAX}$ or less than a lower time limit $T_{lim\_MIN}$ for the predetermined amount of time.

More specifically, if the total switching period $T_{TOT}$ exceeds the upper time limit $T_{lim\_MAX}$ for a predetermined amount of time, such as n switching periods, the controller 120 is configured to decrease the on-time $T_{ON}$, therefore transferring less charge to the output capacitor $C_{OUT}$. Conversely, if the total switching period $T_{TOT}$ is less than the lower time limit $T_{lim\_MIN}$ for a predetermined amount of time, the controller 120 is configured to increase the on-time $T_{ON}$.

Figure 6:
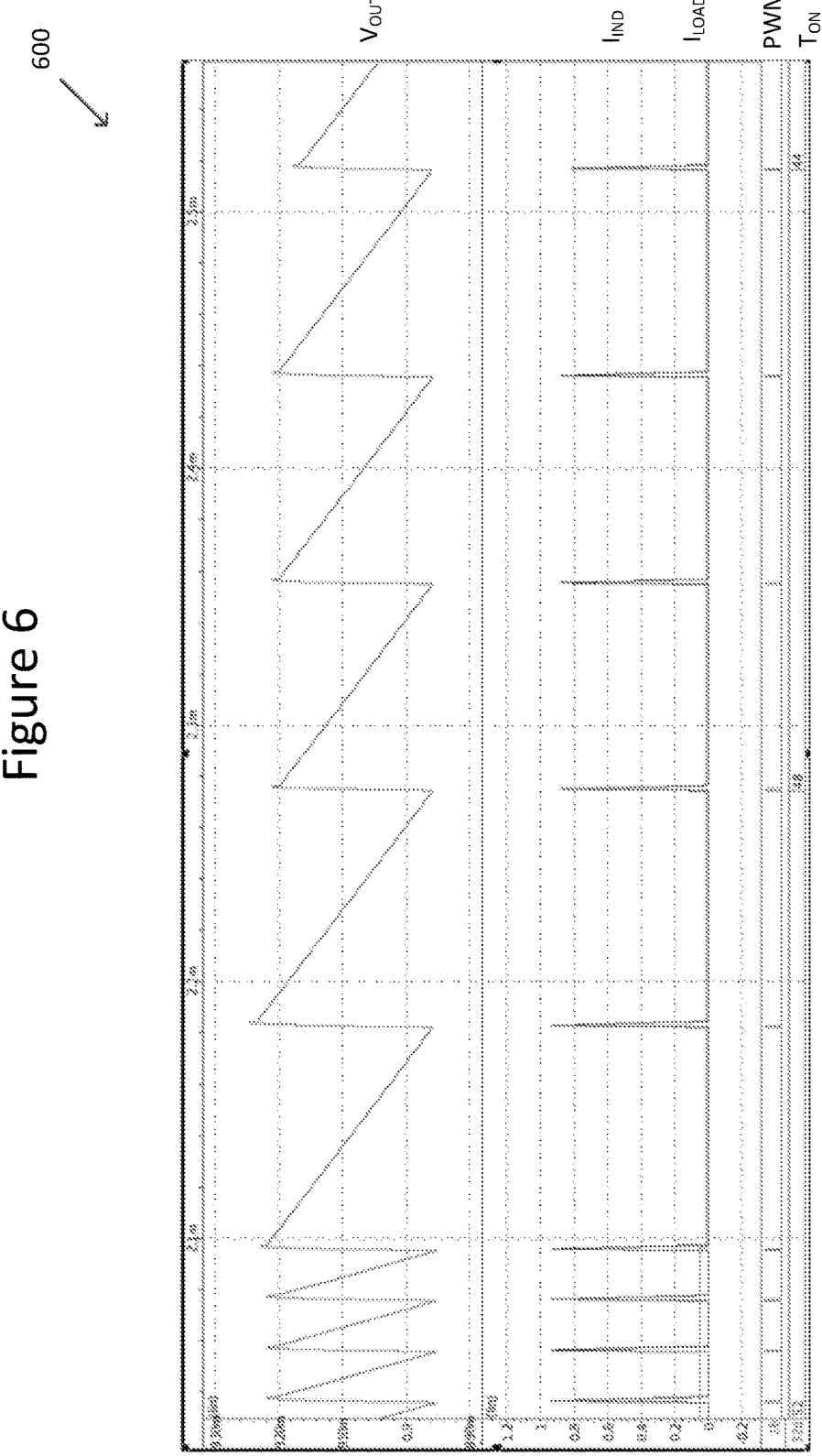
FIG. 6 illustrates another timing diagram in accordance with aspects of the disclosure.

FIG. 6 illustrates a timing diagram 600 when the total switching period $T_{TOT}$ exceeds the upper time limit $T_{lim\_MAX}$ for a predetermined amount of time. The timing diagram 600 shows the output voltage $V_{OUT}$, inductor current $I_{IND}$, load current $I_{LOAD}$, PWM signal, and on-time $T_{ON}$. The predetermined amount of time is programmed.

If the on-time $T_{ON}$ is increased, then the load current $I_{LOAD}$ decreases. The result may be an unnecessary ripple at the output capacitor $C_{OUT}$. A longer on-time $T_{ON}$ means a higher peak in inductor current $I_{IND}$, which means higher ripple in the output voltage $V_{OUT}$.

The controller 120 is configured to monitor the total switching period $T_{TOT}$, and if the total switching period $T_{TOT}$ is too long for at least a predetermined amount of time, the controller 120 decreases the total switching period $T_{TOT}$. In this example, three switching periods are observed before the on-time $T_{ON}$ is decreased. The total switching period $T_{TOT}$ is decreased from 52 to 48 to 44 clock cycles. The effect is that in the end the ripple of the output voltage $V_{OUT}$ is reduced. Conversely, if the total switching period $T_{TOT}$ is too short, the total switching period $T_{TOT}$ can be increased.

Referring back to FIG. 3B, the third dynamic regulation implements a feedforward action in order to adjust the on-time $T_{ON}$ depending on the input voltage $V_{IN}$ (Step 325) of the step-down converter 10. The slope of the inductor current $L_{IND}$ during the on-time $T_{ON}$ is proportional in accordance with the following equation:

$$\frac{V_{IN} - V_{OUT}}{L}. \quad \text{(Equation 1)}$$

The peak of the inductor current $I_{IND}$ is proportional to the input voltage $V_{IN}$. In order to maintain the energy constant, the controller 120 is configured to scale the on-time $T_{ON}$ based on the input voltage $V_{IN}$ of the step-down converter 10. As shown in FIG. 1, the input voltage $V_{IN}$ is input to the controller 120 via the FF-ADC 150. More specifically, the scaling comprises scaling the on-time $T_{ON}$ in accordance with the following equation:

$$\frac{V_{IN,NOM} - V_{OUT}}{V_{IN} - V_{OUT}}, \quad \text{(Equation 2)}$$

where $V_{IN,NOM}$ is the nominal input voltage for the default on-time $T_{ON}$. The feedforward if the input voltage $V_{IN}$ is always active, even when the on-time $T_{ON}$ is adjusted dynamically.

Figure 7:
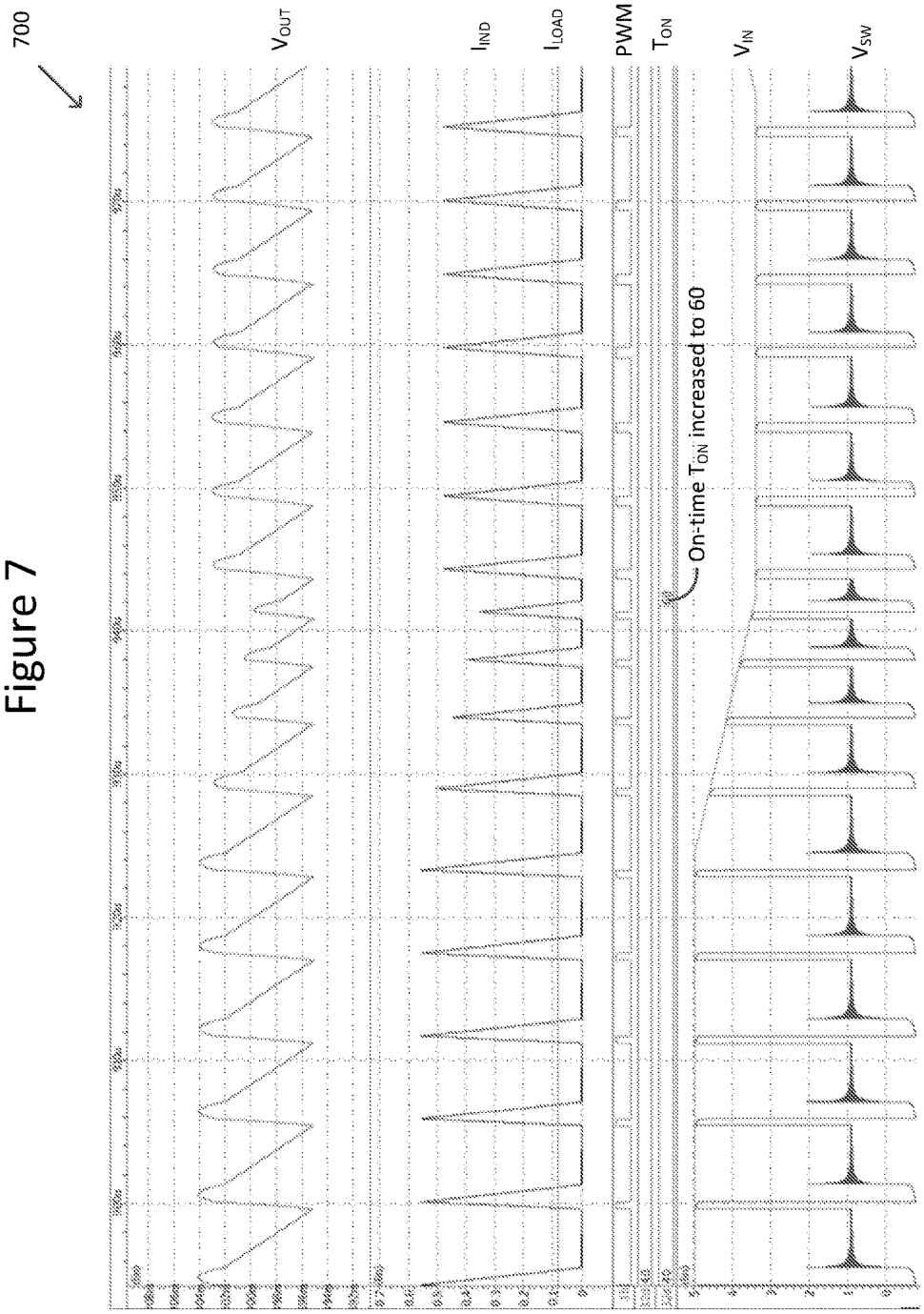
FIG. 7 illustrates another timing diagram in accordance with aspects of the disclosure.

FIG. 7 illustrates a timing diagram 700 showing the feedforward action. The input voltage $V_{IN}$ changes from 5V to 3.3V, and the on-time $T_{ON}$ is increased from 40 clock cycles to 60 clock cycles (i.e., from 40 nsec to 60 nsec), roughly maintaining the peak of the inductor current $I_{IND}$ at the same level before and after the input voltage $V_{IN}$ decrease. More specifically, the peak of the inductor current $I_{IND}$ is decreasing due to the change of the input voltage $V_{IN}$. The controller 120 is configured to compensate for the change in the peak of the inductor current $I_{IND}$ due to the change in the input voltage $V_{IN}$ by returning the peak of the inductor current $I_{IND}$ to a value that is similar to the original value. The ripple in the output voltage $V_{OUT}$ stays relatively constant even if there is a significant change in the input voltage $V_{IN}$.

The input voltage $V_{IN}$ is always monitored, and then the on-time $T_{ON}$ is scaled based on this quantity. It is not necessary to track every change in the input voltage $V_{IN}$. An input voltage $V_{IN}$ range can be defined (e.g., between 3 and 4 V), and an appropriate scaling coefficient applied, roughly following the Equation (2) above.

The apparatus 100 of this disclosure is advantageous in many respects. The apparatus 100 does not require high precision current sensors and detectors, high computational power, or many memory elements. The apparatus 100 can be integrated easily in new and also existing systems. Power consumption of the controller 120 can scaled down with load. Also, the apparatus 100 is compatible with most existing control techniques for high loads, and inherently limits maximum inductor current.

Numerous other embodiments are also contemplated. These include embodiments that have fewer, additional, and/or different components, steps, features, objects, benefits and advantages. These also include embodiments in which the components and/or steps are arranged and/or ordered differently. For example, any signal discussed herein may be scaled, buffered, scaled and buffered, converted to another state (e.g., voltage, current, charge, time, etc.), or converted to another state (e.g., from HIGH to LOW and LOW to HIGH) without materially changing the underlying control method. Further, bipolar transistors (e.g., PNP or NPN) can be used instead of MOS transistors. A PNP may be used instead of NPN, and a PMOS may be used instead of NMOS.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. A method for controlling a step-down converter, comprising:
   setting an on-state time ($T_{ON}$) to a default $T_{ON}$;
   dynamically adjusting the $T_{ON}$ by scaling the $T_{ON}$ based on an input voltage of the step-down converter, wherein the scaling comprises scaling the $T_{ON}$ according to:

$$\frac{V_{IN,NOM} - V_{OUT}}{V_{IN} - V_{OUT}},$$

where $V_{IN,NOM}$ is a nominal input voltage for the default $T_{ON}$, $V_{OUT}$ is the output voltage of the step-down converter, and $V_{IN}$ is the input voltage of the step-down converter;
   switching, when an output voltage of the step-down converter falls below a reference output voltage, the step-down converter to an on-state for a duration of the $T_{ON}$; and
   switching, at the end of the $T_{ON}$, the step-down converter to an off-state for a minimum off-state time ($T_{OFF}$).

2. The method of claim 1, wherein the dynamically adjusting the $T_{ON}$ comprises:
   increasing the $T_{ON}$ when the output voltage of the step-down converter at end of the $T_{ON}$ is less than a second reference output voltage.

3. The method of claim 1, wherein the dynamically adjusting the $T_{ON}$ comprises:
   adjusting the $T_{ON}$ when a length of time of a switching period of the step-down converter is outside of a predetermined time range for a predetermined amount of time.

4. The method of claim 3, wherein the dynamically adjusting the $T_{ON}$ comprises:
   decreasing the $T_{ON}$ when the length of time of the switching period is greater than an upper time limit of the switching period for the predetermined amount of time; and
   increasing the $T_{ON}$ when the length of time of the switching period is less than a lower time limit of the switching period for the predetermined amount of time.

5. The method of claim 1, further comprising:
   repeating the dynamically adjusting, the switching to the off-state, and the switching to the on-state steps.

6. An apparatus for a step-down converter, the apparatus comprising:
   a driver; and
   a controller configured to:
   set an on-state time ($T_{ON}$) to a default $T_{ON}$,
   dynamically adjust the $T_{ON}$ by scaling the $T_{ON}$ based on an input voltage of the step-down converter, wherein the scaling comprises scaling the $T_{ON}$ according to:

$$\frac{V_{IN,NOM} - V_{OUT}}{V_{IN} - V_{OUT}},$$

where $V_{IN,NOM}$ is a nominal input voltage for the default $T_{ON}$, $V_{OUT}$ is the output voltage of the step-down converter, and $V_{IN}$ is the input voltage of the step down converter,
   control the driver to drive the step-down converter to an on-state for a duration of the $T_{ON}$, when an output voltage of the step-down converter falls below a reference output voltage, and
   control the driver to drive the step-down converter to an off-state at the end of the $T_{ON}$ for a minimum off-state time ($T_{OFF}$).

7. The apparatus of claim 6, wherein the controller is configured to:
   control the driver to drive the step-down converter to the on-state by driving a high-side switch of the step-down converter on, and a low-side switch of the step-down converter off, and
   control the driver to drive the step-down converter to the off-state by driving the high-side switch of the step-down converter off, and the low-side switch of the step-down converter on.

8. The apparatus of claim 6, wherein the controller is configured to:
   control the driver to drive the step-down converter to the on-state by driving a high-side switch of the step-down converter on, and
   control the driver to drive the step-down converter to the off-state by driving the high-side switch of the step-down converter off.

9. The apparatus of claim 6, wherein the dynamically adjusting the $T_{ON}$ comprises:
   increasing the $T_{ON}$, when the output voltage of the step-down converter at end of the $T_{ON}$ is less than a second reference output voltage.

10. The apparatus of claim 6, wherein the dynamically adjusting the $T_{ON}$ comprises:
    adjusting the $T_{ON}$, when a length of time of a switching period of the step-down converter is outside of a predetermined time range for a predetermined amount of time.

11. The apparatus of claim 10, wherein the dynamically adjusting the $T_{ON}$ comprises:
    decreasing the $T_{ON}$ when the length of time of the switching period is greater than an upper time limit of the switching period for the predetermined amount of time; and
    increasing the $T_{ON}$, when the length of time of the switching period is less than a lower time limit of the switching period for the predetermined amount of time.

12. The apparatus of claim 6, further comprising:
    a feedforward analog-to-digital converter configured to convert the input voltage of the step-down converter from analog to digital, and provide the digital input voltage to the controller.

13. The apparatus of claim 6, further comprising:
    a feedback analog-to-digital converter configured to convert the output voltage of the step-down converter from analog to digital, and provide the digital output voltage to the controller.

14. The apparatus of claim 6, wherein the controller is a digital controller.

\* \* \* \* \*